3,347,807
FIRE RETARDANT BITUMINOUS COMPOSITIONS

Noel D. Blair, Tonawanda, and Claude Thomas Bean, Jr., Niagara Falls, N.Y., assignors to Hooker Chemical Corporation, Niagara Falls, N.Y., a corporation of New York
No Drawing. Filed Dec. 2, 1963, Ser. No. 327,493
16 Claims. (Cl. 260—28.5)

This invention relates to novel fire retardant bituminous compositions and to methods for rendering bituminous materials fire retardant.

Bituminous materials find numerous commercial applications, such as roofing materials, which may be either asphalt shingles or in built up roofs. Additional uses are in coated or impregnated papers, floor tile and protective coatings, emulsions and paints, for example, for coating outdoor wooden structures. These and other uses are better served by bituminous compositions that are fire retardant and flame resistant.

Accordingly, it is an object of this invention to provide fire retardant bituminous compositions. It is a further object of this invention to provide methods for reducing the flammability of bituminous materials to the non-burning state.

Yet another object of this invention is to provide a novel bituminous composition which, when exposed to flame, will generate an intumescent insulating layer and at the same time generate gases of a low order of toxicity upon flame decomposition and destructive distillation of the bituminous film.

These and other objects of the invention will become apparent as the description of the invention and the examples illustrative of the invention are more fully developed in the specification.

In accordance with this invention there is provided a fire retardant bituminous composition comprised of (a) a bituminous material and (b) a Diels-Alder adduct of a polyunsaturated aliphatic compound and a polyhalogenated cyclopentadiene having the formula:

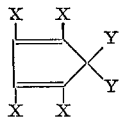

wherein X is selected from the group consisting of fluorine, chlorine and bromine and Y is selected from the group consisting of fluorine, chlorine, bromine and an alkoxy radical; and the Diels-Alder adduct contains at least about 0.6 mol of polyhalogenated cyclopentadiene per mole of polyunsaturated aliphatic compound. The alkoxy mentioned generally contains from 1 to 10 carbon atoms and will preferably contain from 1 to 6 carbon atoms. The polyunsaturated aliphtic compound utilized in this invention contain from 4 to 14 carbon atoms, and contain 2 to 4 sites of carbon to carbon unsaturation. It is within the scope of this invention to polymerize the polyunsaturated aliphatic compound to a high molecular weight by conventional rubber polymerization techniques so that the resulting polymer is properly described by the term rubber. These rubbers contain carbon to carbon unsaturation which can be as much as slightly less than 1 mole of carbon to carbon unsaturation per mole of the polyunsaturated aliphatic compound starting material. Generally these polymers have molecular weight from about 100,000 to about 300,000 although they can have molecular weight as low as about 50,000 or as high as about 400,000.

Illustrative of polyhalogenated cyclopentadienes suitable for use in this invention are the following:

Hexachlorocyclopentadiene
5,5-dimethoxytetrachlorocyclopentadiene
Hexabromocyclopentadiene
5,5-dibromotetrachlorocyclopentadiene
5,5-difluorotetrachlorocyclopentadiene
5,5-diethoxytetrachlorocyclopentadiene Satisfactory polyunsaturated aliphatic compounds for use in preparing the Diels-Alder adduct of this invention include both linear and cycloaliphatic compounds, as exemplified, but not limited by the following:

1,3-butadiene
1,5-hexadiene
1,7-octadiene
1,11-dodecadiene
Methyl cyclopentadiene
Dimethyl butadiene
Dicyclopentadiene
Bicyclo[2.2.1]heptadiene 2,5
1,5 cyclooctadiene
Methyl butadiene
Cyclo hexadiene and the olefin polymers and copolymers of the above monomers such as cis-1,4-polybutadiene polymers. It is preferable that the fire retardants of this invention contain substantially 2 moles of polyhalogenated cyclopentadiene per mole of polyunsaturated aliphatic compound containing 4 to 14 carbon atoms. When the fire retardant of this invention is an adduct of polymerized polyunsaturated aliphatic compound, the ratio of moles of polyhalogenated cyclopentadiene to unit of unsaturation of the polymerized compound may satisfactorily vary from about 0.6 to 1.0.

The preparation of 2,2′,3,3′,4,4′,5,5′,7,7,7′,7′-dodecachloro - 1,1,1′,1′, - 6,6′-hexahydro-2,2′,5,5′,-methano biphenyl is disclosed in United States Patent 2,606,910, issued Aug. 12, 1952. For convenience this compound will be referred to by its empirical formula $C_{14}H_6Cl_{12}$. The adduct is prepared by condensing two moles of hexachlorocyclopentadiene with 1 mole of 1,3-butadiene at a temperature below 200 degrees centigrade and thereafter recrystallizing the reaction product from isopropyl alcohol. The compound melts at about 232 degrees centigrade.

The preparation of bis(1,2,3,4,7,7 hexachlorobicyclo[2.2.1]hept-2-ene-5-yl)butane may be effected by condensing 2 moles of hexachlorocyclopentadiene with 1 mole of 1,7-octadiene. The condensate is prepared at a temperature between 40 and 200 degrees centigrade and the excess hexachlorocyclopentadiene is removed by vacuum distillation. Thereafter the condensate is recrystallized from benzene to obtain a product that melts at 230 to 233 degrees centigrade. For convenience this compound will be referred to by its empirical formula $C_{18}H_{14}Cl_{12}$.

As indicated above, the polyunsaturated aliphatic compound can be a polymerized polyunsaturated compound such as cis-1,4-butadiene. One process for the production of polybutadiene in which a very high percentage of the polymer is formed by the cis-1,4 addition of the butadiene is described in United States Patent Number 3,004,018. In this process a rubbery polymer of 1,3-butadiene which has a high percentage of polymer formed by the cis-1,4 addition of the butadiene obtained when 1,3-butadiene is polymerized in the presence of a metal catalyst composition comprising (a) an organo metal compound of the formula $R_nM$ where R is an alkyl radical containing up to about 12 carbon atoms; M is a metal selected from the group consisting of mercury and zinc; and n is a number equal to the valence of the metal; (b) titanium tetraiodide. The polymer produced by this process contains from about 85 percent up to about 93 percent and higher cis-1,4-addition. The amount of organometal compound used in the catalyst composition is usually within the range of about 1 to 50 moles per mole of titanium tetraiodide. The polymerization of butadiene can be carried out in a temperature range of minus 80 to 150 degrees centigrade in the presence of a hydrocarbon diluent such as benzene, toluene, xylene, normal hexane, isooctane, normal decane, cyclohexane, methylcyclohexane and mixtures thereof. At the completion of the polymerization reaction, the catalyst is inactivated, rubbery polymer is precipitated from the solution with an alcohol, and is then recovered from the diluent. Other methods are known from producing polybutadiene containing at least 80 percent cis-1,4 configuration and it is intended to encompass by the present invention the above described cyclopentadiene adducts of such polybutadienes regardless of the process by which the cis-polybutadienes are produced.

In preparing the Diels-Alder adducts of the polyhalogenated cyclopentadienes and the polymerized polyunsaturated aliphatic compounds described above, it is preferred to utilize in the reaction mixture at least about 5 parts by weight of polyhalogenated cyclopentadiene per part of rubber. The use of this ratio insures that sufficient halocyclopentadiene is available to obtain the desired reaction product in a reasonable length of time. However, molar ratios such as three to four parts of halocyclopentadiene can be used per part of rubber, but longer reaction times are required. Much larger quantities of halocyclopentadiene can be utilized, for example, up to 100 parts of halocyclopentadiene per part of rubber and higher. In fact, it is convenient to use the halocyclopentadiene as the diluent in the reaction mixture to reduce viscosity of the reaction mixture and to avoid the use of extraneous diluent in the reaction system. However, other diluents that are not deleterious to the reaction can be used. Suitable diluents for this purpose include aliphatic, cycloaliphatic, aromatic hydrocarbon such as hexane, isooctane, normal decane, benzene, toluene, xylene, cyclohexane, methyl cyclohexane and the like, as well as chlorinated hydrocarbons such as chloroform, methylene chloride, trichloroethane, propylene dibromide, and trichloro benzenes, also ketones and esters. The aromatic hydrocarbons are the preferred diluents. It is generally preferred that the boiling point of the diluent not exceed about 200 degrees centigrade to facilitate removal from the unreacted halocyclopentadiene. The ratio of solvent used in the reaction mixture generally does not exceed about 100 parts per part of rubber reactant. This reaction proceeds best at elevated temperatures, preferably in the range of 100 to 170 degrees centigrade. However, a temperature range of 70 to 200 degrees centigrade is suitable. It is generally convenient to conduct the reaction at atmospheric pressure, although it is sometimes desirable to carry out the reaction at super-atmospheric pressures or under vacuum, depending upon the use of the diluents and reaction temperatures.

Many types of bituminous materials are commercially available, ranging from those derived from petroleum (asphaltic products) to those derived from coal tar. The asphaltic products include native asphalts, residual asphalts, blown petroleum asphalts precipitated by propane, fatty-acid pitches, and asphalts modified with oil such as linseed oil, cotton seed oil, castor oil, vegetable oils, and animal oils, and various mixtures thereof. The tar products include pitch obtained by distilling the highly volatile oils from coal tar as well as combinations thereof with oil, gas tar, and water gas tar. These materials are provided in the form of semi-liquids to semi-solids where they are to be used for impregnating felted or woven fabrics in roofing or insulating compositions. The same groups of substances are also commonly prepared with a harder consistency and also with a higher fusing point. The latter materials are used primarily for coating or adhesive compositions. The foregoing list of bituminous materials is set forth to provide a better understanding of the type of material contemplated by the term bituminous material. These and other bituminous materials are useful in the present invention.

The halogenated Diels-Alder adducts of the present invention are desirably incorporated in the bituminous materials in an effective fire retardant amount. Generally, halogenated Diels-Alder adducts in the amount of from about 2 to about 50 percent by weight of the bituminous composition and preferably from about 3 to 30 percent by weight are mixed with bituminous composition. Improved fire retardants can be provided by incorporating antimony compounds in the bituminous compositions in the amount of about 1 to about 10 percent by weight of said bituminous composition, preferably about 5 percent.

Antimony oxide is the antimony compound that is presently preferred for use in the present invention. However, many antimony compounds are suitable. Suitable antimony compounds inclue the sulfides of antimony, the alkali salts of Group I of the Periodic Table, antimony salts of organic acids and their pentavalent derivatives and the esters of antimonious acids and their pentavalent derivatives. It is convenient to use sodium antimonite or potassium antimonite when it is desired to use an alkali metal salt of the antimony for compositions of this invention. United States Patent 2,996,528 discloses suitable antimony salts of organic acids and their pentavalent derivatives. Compounds of this class include antimony butyrate, antimony valerate, antimony caproate, antimony heptylate, antimony caprylate, antimony pelargonate, antimony caprate, antimony cinnamate, antimony anisate, and their pentavalent dihalide derivatives. Likewise the esters of antimonious acids and their pentavalent derivatives disclosed in U.S. Patent 2,993,924 such as tris(n-octyl)antimonite, tris(2-ethylhexyl)antimonite, tribenzyl antimonite, tris(beta-chloroethyl)antimonite, tris(beta-chloropropyl)antimonite, tris(beta - chlorobutyl)antimonite, and their pentavalent dihalide derivatives. Still other suitable organic antimony compounds are the cyclic antimonites such as trimethylol propane antimonite, pentaerythritol antimonite and glycerol antimonite.

The halogenated Diels-Alder fire retardant adducts additionally exert a stabilizing influence on the bituminous composition. These adducts possess high melting points and tend to remain in the solid state with the application of heat, thereby materially reducing the flow of the bituminous material and its ability to spread fire by the dripping of flaming or molten bituminous materials. Additionally, the polymerized polyunsaturated aliphatic Diels-Alder adducts impart a high degree of flexibility to bituminous coatings which is highly desirable when impregnating papers, felts and so forth.

The bituminous compositions have been applied to the substrate with the aid of heat and/or pressure in order to achieve a uniform coating with satisfactory bonding characteristics between the coating and the substrate. However, in many cases the use of heat and/or pressure to achieve a coating has not been convenient and in such cases a solvent has been used to reduce the viscosity of composition to a brushable, sprayable or otherwise pliable consistency. The solvent method is the convenient method for applying bituminous coating to roofs, fences, bridges, etc., but it suffers from the fire hazards usually associated therewith. Therefore, it is another aspect of this invention to provide fire retardant bituminous compositions when utilizing the solvent method of applying bituminous compositions to substrates. These fire retardant coating compositions may contain from about 5 to 85 percent and usually from about 30 to about 75 percent of the bituminous fire retardant compositions as previously described. Preferably, the compositions will contain from about 50 to about 70 percent bituminous fire retardant composition. The balance of the coating composition is a volatile halogenated hydrocarbon solvent which is compatible with the halgenated Diels-Alder adduct in the bituminous material.

The halogenated hydrocarbon solvent of the present composition results in compositions of viscosities in the range of 10 to 1000 centipoises at 25 degrees centigrade. The products of higher viscosity may be thinned by the application of heat in a controlled fashion. One does not have to apply as much heat to thin such compositions to the desired viscosity as would be needed in the absence of the solvent.

The preferred solvent has the boiling point which allows for the rapid evaporation thereof after the application of the invented fire retardant bituminous compositions, yet is employed in such proportion and is of such properties that the uniform coatings are obtained when the composition is applied by spray means. This boiling point is usually in the range of about 30 to about 200 degrees centigrade and preferably is of about 40 degrees to 150 degrees centigrade. The halogenated solvents described are not flammable and exert a "snuffing action," preventing or inhibiting ignition of the coating composition while it is being applied. This snuffing action is particularly useful when the invented composition is being sprayed so that minute particles and vapors of bituminous matter are not ignited. The preferred solvent in the invented fire retardant bituminous composition is trichloroethylene, although other halogenated hydrocarbon solvents preferably chlorinated unsaturated hydrocarbons from 1 to 2 carbon atoms, are used successfully, too. Among the satisfactory solvents, listed with their boiling points are the following.

| Solvent: | Boiling Point, °C. |
|---|---|
| Methylene chloride | 40 |
| Trichlorotrifluoroethane | 46 |
| 1,2-dichloroethylene | 60 |
| Chloroform | 61 |
| Trichloroethane | 74 |
| Carbon tetrachloride | 77 |
| Trichloroethylene | 87 |
| Tetrachlorodifluoroethane | 92 |
| Bromochloroethane | 107 |
| Dibromoethane | 110 |
| Perchloroethylene | 121 |
| Unsym-tetrachloroethane | 130 |
| Sym-tetrachloroethane | 146 |

Mixtures of the above solvents may also be used to obtain the exact evaporation rate, viscosity, flash-fire inhibition or other property desired.

The following examples are presented to illustrate the invention further, without being limited thereby. All parts and percentages are by weight and all temperatures are in degrees centigrade, unless otherwise indicated.

*Example 1.—Preparation of polymeric fire retardant*

50 parts of "Cis-4" polybutadiene rubber having a cis-1,4 content of 95 percent and 320 parts of hexachlorocyclopentadiene that had been treated with magnesium oxide for removal of impurities and 172 parts xylene commercial grade, were introduced into a reactor. The reactor contents were heated for three hours at 90 to 100 degrees centigrade with agitation, to dissolve the rubber, and then for twenty hours at 150 degrees. The resulting polymer solution was poured into methanol, redissolved in toluene and then precipitated from methanol. The resulting light polymer had a chlorine content of 57.9 percent and an intrinsic viscosity of 0.4504 dl./g. at 30 degrees.

*Example 2.—Preparation of base material*

60.5 parts of asphalt were heated to 200 degrees until melted. The molten asphalt was then removed from the source of heat and 32.5 parts of mineral spirits were added with stirring. Stirring was continued and 7.0 parts of finely divided asbestos fiber (Quebec Asbestos Standard Grade 7R) were added. The mixture was then cooled to room temperature and used as base material for the flame retardant compositions of the following examples. When it is desirable to prepare compositions with other solvents such as trichloroethylene, the above procedure is used except that the desired solvent is substituted for a like amount of mineral spirits of Example 2.

*Example 3.—Fire retardant compositions*

To 100 parts of the base material of Example 2 were added three parts (5 percent based on asphalt content) of $C_{14}H_6Cl_{12}$ and three parts (5 percent based on asphalt content) of antimony oxide with stirring until uniform. The halogen content of this composition was 2.9 percent.

A coating was prepared on three inch by twelve inch saturated asphalt felt (used as an intermediate in the manufacture of composition shingles) by applying the above composition with a knife at a coverage rate of two gallons for each 100 square feet (a film of about 1/16 of an inch). The strips were allowed to dry until substantially all of the mineral spirits were removed.

Testing was performed to determine the relative flammability of the coating by supporting the strip at an angle of 30 degrees from the vertical, in a draft free hood, and applying a flame from a compressed propane portable blow torch. The torch flame was adjusted to give a 1½ inch inner blue cone and applied perpendicular to the face of the strip for a period of 15 seconds and then removed. The self extinguishing time was recorded. A second 15 second flame application was made immediately after the first flame was extinguished and the self extinguishing time for the second application was recorded. If the specimen was self extinguishing or did not burn upon the second ignition it was judged to be self extinguishing by this test. Intumescence was measured at the highest point of rise.

The composition of this invention was self extinguishing in 1.5 seconds after the first ignition and 4.0 seconds after the second ignition. An intumescence of 0.25 inch was observed. The composition was considered to be nonburning.

In a manner similar to Example 3 other compositions were prepared and tested. Results are summarized in the table below.

TABLE I

| Example | Fire Retardant | Parts of Retardant | Parts $Sb_2O_3$ | Self-Extg. Time (sec.) | | Intumescence (inc.) | Flammability |
|---|---|---|---|---|---|---|---|
| | | | | 1st Appln. | 2nd Appln. | | |
| 4 | $C_{14}H_6Cl_{12}$ | 6.0 | 3.0 | 1.0 | 2.0 | .37 | Nonburning. |
| 5 | $C_{14}H_6Cl_{12}$ | 12.1 | 3.0 | 1.0 | 1.0 | .56 | Do. |
| 6 | $C_{14}H_6Cl_{12}$ | 18.2 | 3.0 | 1.0 | 1.0 | .75 | Do. |
| 7 | $C_{14}H_6Cl_{12}$ | 1.8 | | 6.0 | 26.5 | .19 | Do. |
| 8 | $C_{18}H_{14}Cl_{12}$ | 18.2 | 3.0 | 2.2 | 8.1 | .44 | Do. |
| 9 | | | 3.0 | 7.0 | burns | none | Burning. |

Similar results are obtained when the fire retardant is a Diels-Alder adduct of 5,5-dimethoxy tetrachlorocyclopentadiene, rather than hexachlorocyclopentadiene.

*Example 10*

To 100 parts of the base material of Example 2 were added 3 parts (5% based upon asphalt content) of the Diels-Alder adduct of Example 1 and three parts (5% based upon asphalt content) of antimony oxide with stirring until uniform. The halogen content of this composition was 2.4 percent. Coatings were prepared and tested in the manner of Example 3, with the exception that the samples were mounted at an angle of 60 degrees from the vertical. The composition of this experiment was self extinguishing in 2.7 seconds after the first ignition and in 11.5 seconds after the second ignition. An intumescence of 0.08 inch was observed. The composition was considered to be non-burning.

In a manner similar to Example 10 other compositions were prepared and tested and are summarized in the table below.

TABLE II

| Example | Fire Retardant | Parts of Retardant | Parts Sb₂O₃ | Self-Extg. Time (sec.) | | Intumescence (inc.) | Flammability |
| --- | --- | --- | --- | --- | --- | --- | --- |
| | | | | 1st Appln. | 2nd Appln. | | |
| 11 | Ex. 1 | 6.1 | 3.0 | 3.1 | 9.0 | .27 | Non-burning. |
| 12 | Ex. 1 | 12.1 | 3.0 | 1.9 | 7.1 | .31 | Do. |
| 13 | Ex. 1 | 18.2 | 3.0 | 3.1 | 5.8 | .39 | Do. |
| 14 | | | | 9.6 | burns | none | Burning. |

A second aspect of this invention, reduction of fire hazard during application, is illustrated by Examples 15 through 20. The compositions were tested in the manner of Example 3 except that the compositions contained solvent and were not allowed to dry so as to simulate a possible fire hazard at the time of applying a bituminous coating to a roof. Test specimens were mounted at 60 degrees from the vertical. Each composition contained 60.5 parts asphalt, 7.0 parts asbestos, 32.5 parts solvent. The fire retardant was $C_{14}H_6Cl_{12}$.

TABLE III

| Example | Solvent | Parts Fire Retardant | Parts Sb₂O₃ | Self Extg. time (sec.) | | Intumescence (in.) | Flammability |
| --- | --- | --- | --- | --- | --- | --- | --- |
| | | | | 1st Appln. | 2nd Appln. | | |
| 15 | Mineral Spirit | | | burns | | none | Burning. |
| 16 | do | 3.0 | 3.0 | burns | | none | Burns. |
| 17 | do | 6.1 | 3.0 | 38.8 | 19.8 | 0.17 | Non-burning |
| 18 | Trichloroethylene | | | 2.0 | 3.6 | none | Do. |
| 19 | do | 3.0 | 3.0 | 1.4 | 2.0 | 0.25 | Do. |
| 20 | do | 6.1 | 3.0 | 0.7 | 1.7 | 0.42 | Do. |

Results similar to Examples 18, 19 and 20 are obtained when the solvent is methylene chloride, tetrachlorodifluoroethane, dibromoethane or perchloroethane.

In the foregoing examples it is evident that not only are the compositions in the instant invention fire resistant, but also as the halogen content of the coating is increased the dripping tendency of the coating decreases and intumescence is observed. Herein lies one of the advantages of the invention over prior methods for fire proofing bituminous compositions. The presence of our halogenated compounds and bituminous coatings maintains the viscosity of these coatings high, even at elevated temperatures. By contrast, conventional bituminous compositions drip and run in contact with flames, thereby increasing the fire hazard by spreading the hot melt over the environment.

The temperature of mixing the components of the invention is not critical, ranging from the temperature at which the bituminous material becomes fluid up to the decomposition temperature of the said bituminous material, e.g. about 20 degrees to about 260 degrees centigrade.

The "stabilized" asphalt used in the examples contained asbestos fiber. It is also within the scope of the present invention to use unstabilized asphalts and other bituminous materials as well as to employ other powdered or fibrous fillers, pigments and so forth, that are known in the art. Such substances may be either inorganic or organic in origin and are used for reducing the cost of the finished product, to impart weather resistance or to impart color to the surface coatings. Commonly used additives include silica, limestone, slate dust, clay, black and colored pigments, and calcium carbonate. Various halogenated wax products may also be incorporated in the compositions of the invention.

The bituminous compositions of this invention find many commercial applications. They can be used for saturating felts that are subsequently used as intermediate products in the manufacture of prepared roofings and composition shingles, for constructing built-up roofs, for the manufacture of bituminized floor coverings, for waterproofing cloths, such as tarpaulins, and other applications in which bituminous saturated felts are commonly used. The bituminous compositions can be used in many coating applications such as in the manufacture of shingles, siding for home construction, wrapping and packing paper, electrical transmission insulation, cords and ropes, bituminized wallboard, insulating board and the like, bituminous pipe and asphalt mastic roofs. Other applications include bituminous lacquers and cements. In all such applications the industrial requirements are becoming more stringent regarding the use of fire retardant bituminous compositions. The compositions of our invention satisfy this fast growing need.

Various changes and modifications may be made and equivalents may be substituted in the method in the composition of this invention, certain preferred forms of which have been herein described, but without departing from the scope of this invention. Such modifications are to be regarded as within the scope of this invention.

What is claimed is:

1. A fire retardant bituminous composition comprising (a) a bituminous material and (b) a Diels-Alder adduct of a polyunsaturated aliphatic compound having from 4 to 14 carbon atoms or polymer thereof and a polyhalogenated cyclopentadiene having the formula

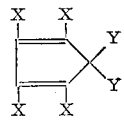

wherein X is selected from the group consisting of chlorine, fluorine and bromine; and Y is selected from the group consisting of fluorine, chlorine, bromine and an alkoxy radical containing 1 to 10 carbon atoms; and the Diels-Alder adduct contains at least about 0.6 mole of polyhalogenated cyclopentadiene per mole of polyunsaturated aliphatic compound, said adduct being present in sufficient proportion from about 2 to about 50 percent by weight to improve the fire retardancy of the bituminous material.

2. A fire retardant bituminous composition comprising (a) a bituminous material, (b) a Diels-Alder adduct of a polyunsaturated aliphatic compound having four to fourteen carbon atoms or polymer thereof and a polyhalogenated cyclopentadiene having the formula

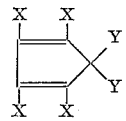

wherein X is selected from the group consisting of fluorine, chlorine and bromine; and Y is selected from the group consisting of fluorine, chlorine, bromine and an alkoxy radical containing 1 to 10 carbon atoms; and the Diels-Alder adduct contains at least about 0.6 mole of polyhalogenated cyclopentadiene per mole of polyunsaturated aliphatic compound, said adduct being present in sufficient proportion from about 2 to about 50 percent by weight to improve the fire retardancy of the bituminous material, and (c) an antimony compound in sufficient proportion to improve the fire retardancy of the bituminous material.

3. A fire retardant bituminous composition comprising (a) a bituminous material and (b) a Diels-Alder adduct of a polyunsaturated aliphatic diene having from 4 to 14 carbon atoms or polymer thereof and hexachlorocyclopentadiene and the Diels-Alder adduct contains at least about 0.6 mole of hexachlorocyclopentadiene per mole of polyunsaturated aliphatic compound, said adduct being present in sufficient proportion from about 2 to about 50 percent by weight to improve the fire retardancy of the bituminous material.

4. A fire retardant bituminous composition comprising (a) a bituminous material, (b) a Diels-Alder adduct of a polyunsaturated aliphatic compound having from four to fourteen carbon atoms or polymer thereof and hexachlorocyclopentadiene, the Diels-Alder adduct containing at least about 0.6 mole of polyhalogenated cyclopentadiene per mole of polyunsaturated aliphatic compound, said adduct being present in sufficient proportion from about 2 to about 50 percent by weight to improve the fire retardancy of the bituminous material, and (c) an antimony compound in sufficient proportion to improve the fire retardancy of the bituminous material.

5. The composition according to claim 4 wherein the antimony compound is antimony oxide.

6. A fire retardant bituminous composition comprising (a) a bituminous material, (b) a Diels-Alder adduct of a polyunsaturated aliphatic compound having from four to fourteen carbon atoms or polymer thereof and 5,5-dimethoxy tetrachlorocyclopentadiene and the Diels-Alder adduct contains at least about 0.6 mole of 5,5-dimethoxytetrachlorocyclopentadiene per mole of polyunsaturated aliphatic compound, said adduct being present in sufficient proportion from about 2 to about 50 percent by weight to improve the fire retardancy of the bituminous material, and (c) an antimony compounds in sufficient proportion to improve the fire retardancy of the bituminous material.

7. The composition according to claim 6 wherein the antimony compound is antimony oxide.

8. The composition according to claim 1 wherein the polyunsaturated aliphatic compound is polybutadiene.

9. The composition according to claim 1 wherein the Diels-Alder adduct is 2,2',3,3',4,4',5,5',7,7,7',7'-dodecachloro-1,1,1',1',6,6'-hexahydro-2,2',5,5'-methanobiphenyl.

10. The composition according to claim 1 wherein the Diels-Alder adduct is 1,4 - bis(1,2,3,4,7,7 - hexachlorobicyclo[2.2.1]hept-2-ene-5-yl)butane.

11. The composition according to claim 1 wherein the Diels-Alder adduct is an adduct of polybutadiene and hexachlorocyclopenadiene and the Diels-Alder adduct contains at least about 0.6 mole of hexachlorocyclopentadiene per mole of combined butadiene in the polybutadiene reactant.

12. A method for applying a fire retardant bituminous composition to a surface to be coated which comprises applying the composition of claim 13, to the surface to be coated and evaporating the halogenated hydrocarbon from said surface during the application and afterwards to reduce the flammability of the composition at such times and to leave on the surface a fire retardant bituminous coating.

13. A fire retardant bituminous composition comprising the composition of claim 1 and a halogenated hydrocarbon solvent.

14. A fire retardant bituminous composition comprising the composition of claim 2 and a halogenated hydrocarbon solvent.

15. A fire retardant bituminous composition shingle containing the fire retardant bituminous composition of claim 1.

16. A flame retardant bituminous composition shingle containing the fire retardant bituminous composition of claim 2.

References Cited
UNITED STATES PATENTS

| | | | |
|---|---|---|---|
| 2,606,910 | 1/1946 | Herzfeld et al. | 260—346.6 |
| 2,724,730 | 11/1955 | Johnson | 260—648 |
| 3,098,058 | 7/1963 | Schweiker et al. | 260—45.5 |
| 3,151,992 | 10/1964 | Blair et al. | 106—15 |

OTHER REFERENCES

McBee et al.: "The Diels-Alder Reaction With 5,5-Dimethoxy-1-2,3,4-Tetra-Chloro Cyclopentadiene," Journal of American Chemical Society, 1955, vol. 77, page 385, QD 1 A5.

Engnade et al.: "The Chemistry of Perchlorocyclopentenes and Cyclopentadienes," Chem. Reviews, 1958, vol. 58, page 256.

Abraham, "Asphalts and Allied Substances," N.Y., Van Nostrand Company, Inc., vol. 3, pages 60, 245, 246, 311–315, 373, 374. TN 853 A35 1960 C.3.

MORRIS LIEBMAN, *Primary Examiner.*

ALLAN LIEBERMAN, *Examiner.*

J. A. GAZEWOOD, H. S. KAPLAN, *Assistant Examiners.*